United States Patent [19]
Cochran et al.

[11] Patent Number: 5,118,241
[45] Date of Patent: Jun. 2, 1992

[54] INTERFACE FOR CARGO LOADERS

[76] Inventors: Joseph W. Cochran, 1264 Cantera Ct., Pebble Beach, Calif. 93953; Victor H. Carder, 110 Pointview La., Apt. 1610, Huntsville, Ala. 35801

[21] Appl. No.: 594,146

[22] Filed: Oct. 10, 1990

[51] Int. Cl.⁵ .............................................. B60P 1/52
[52] U.S. Cl. ................................. 414/345; 14/71.1; 198/782; 414/347; 414/398; 414/401; 414/495; 414/505; 414/535
[58] Field of Search ........................... 414/345–347, 414/495, 532, 529, 535, 584, 401, 398, 502, 503, 505, 390–392, 523, 349, 351, 352; 14/69.5, 71.1; 198/782, 588

[56] References Cited

U.S. PATENT DOCUMENTS

| | | | |
|---|---|---|---|
| 1,073,376 | 9/1913 | Vivian | 414/398 X |
| 2,379,094 | 6/1945 | Maxon, Jr. | 414/347 |
| 2,926,797 | 3/1960 | Decker | 414/347 |
| 3,126,112 | 3/1964 | Shaw et al. | 414/495 |
| 3,357,582 | 12/1967 | Wittek | 414/495 |
| 3,666,127 | 5/1972 | Guyaux | 414/495 |
| 3,687,321 | 8/1972 | Goodhart et al. | 414/495 |
| 3,819,068 | 6/1974 | Weir | 414/398 X |
| 3,944,096 | 3/1976 | Carder | 414/345 |
| 3,952,886 | 4/1976 | Hazne | 414/392 |
| 3,972,427 | 8/1976 | Stanley et al. | 414/495 X |
| 4,084,751 | 4/1978 | Galis | 414/345 X |
| 4,089,100 | 5/1978 | Berry, Jr. | 414/495 X |
| 4,304,518 | 12/1981 | Carder et al. | 414/495 |
| 4,593,810 | 6/1986 | Cook | 414/535 X |
| 4,783,190 | 11/1988 | Lovgren | 414/347 |
| 4,799,848 | 1/1989 | Buckley | 414/347 |

FOREIGN PATENT DOCUMENTS

| | | | |
|---|---|---|---|
| 8602026 | 3/1988 | Netherlands | 414/535 |
| 2102377 | 2/1983 | United Kingdom | 414/401 |

Primary Examiner—David A. Bucci
Attorney, Agent, or Firm—Beveridge, DeGrandi & Weilacher

[57] ABSTRACT

An interface for cargo loaders which is especially suited for use with aircraft cargo loaders. The interface is secured to a deck structure forming part of the cargo loader. The interface includes a primary interface member which can be extended or retracted with respect to the end of the deck. In addition to extension and retraction, the primary interface member can be angularly adjusted with respect to the end of the deck. A secondary interface member is stowed adjacent to the primary interface or nested within a recess formed in the primary interface. The secondary interface can be extended or retracted with respect to the primary interface member. The secondary interface can also be designed for angular adjustment. The primary interface also includes lateral extension members which can be varied in position to either decrease or increase the transverse length of the primary interface member. The flexibility in elongation, retraction and angular positioning of the interface system enables a loader to be used with a greater variety of cargo loading areas and is especially useful in adapting to the multitude of different air craft cargo doos, especially those with recessed door sills.

41 Claims, 6 Drawing Sheets

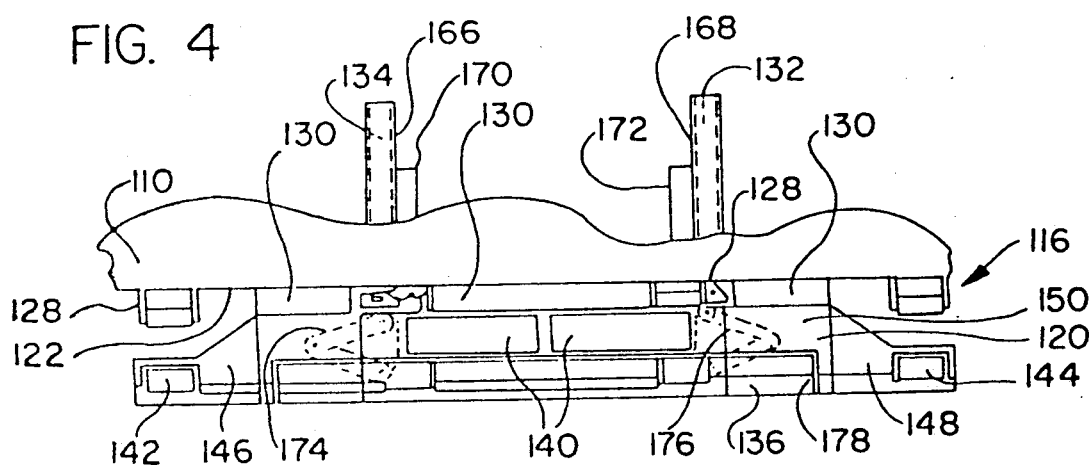
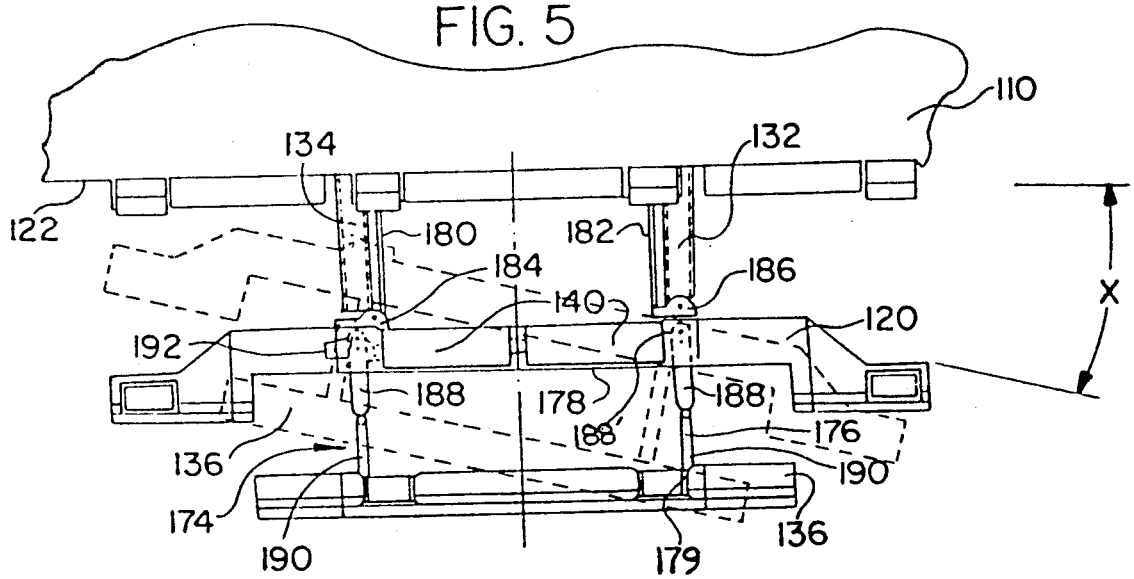
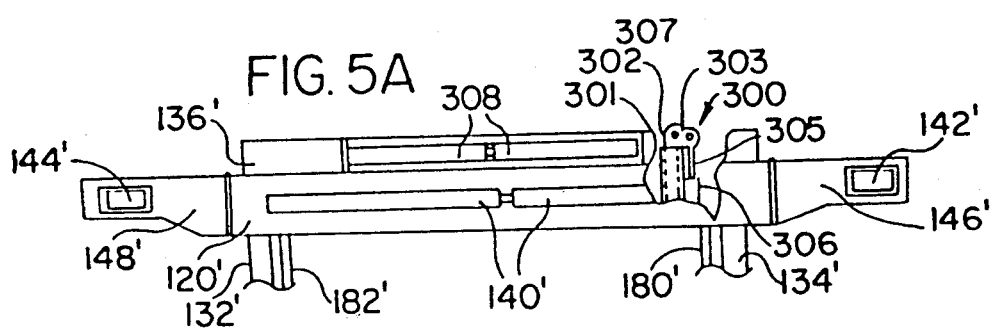

INTERFACE FOR CARGO LOADERS

BACKGROUND OF THE INVENTION

FIELD OF THE INVENTION

This invention relates to an interface for a cargo loader which includes means for adjusting to accommodate different size docking means and positions. More specifically, this invention relates to an articulating interface especially suited for use with an aircraft cargo loader.

The commercial and military fleet of cargo aircraft is very diverse with each airplane having one or more possible cargo compartments and loading doors. Because of the predominance of wide body aircraft in the transport fleet, the tendency has been towards the development and fielding of large multipallet loaders having their own propulsion means and powered container handling features.

Since many commercial and military cargo aircrafts can be loaded from front or rear doors, the loader body width has usually been made in the prior art of a width of 96, 108, or 125 inches to accommodate the various standard wide-body pallets and containers. However, many lower deck doors and access openings on small aircraft are smaller in width than 96 inches (e.g., 60-90 inches).

Moreover, the prior art cargo loading equipment, used to access smaller aircraft doors recessed into the fuselage of the airplane, generally consisted of container lifts made narrow to fit the smaller openings associated with such aircraft cargo doors. Some prior art cargo lifts require that the containers be manually pushed on and pushed off the cargo loader. Thus, in addition to not being flexible enough to handle the diverse range of aircraft loading and unloading cargo areas, such prior art cargo loading equipment also require excessive handling in loading or unloading containers from an aircraft.

U.S. Pat. No. 3,944,096 illustrates an angularly adjustable, powered interface for use with a freight transporter and loader. The angular adjustment feature of the interface of U.S. Pat. No. 3,944,096 enables the operator to adjust the loader for accessing "behind the wing" cargo doors. U.S. Pat. No. 3,944,096, however, fails to provide access to aircraft cargo compartments of all recent wide and narrow body cargo aircraft.

SUMMARY OF THE INVENTION

The present invention presents a solution to the above-noted problems concerning the lack of flexibility in the prior art aircraft cargo loaders and their inability to handle the diverse range of aircraft cargo openings. In addition, the present invention provides the required flexibility while also avoiding difficult operation procedures such that an operator can easily handle the system and load and unload an aircraft at a relatively fast rate.

The following summary description is made in reference to an interface system specifically adapted for use within an aircraft cargo loader. The present invention can also be useful in association with other vehicles having similar requirements to that of an aircraft cargo loader. However, the present invention is especially suited for handling the diverse range of aircraft cargo access openings.

The interface system of the present invention includes a deck and a primary interface connected to the deck by way of connecting means. The connecting means for connecting the primary interface to the deck includes a first extension-retraction means for extending and retracting the primary interface with respect to the deck. The primary interface has a recess or a receiving area formed along one of its sides which is dimensioned to receive, in stowable fashion, a secondary interface member. Alternatively, the secondary interface member may be retracted against the primary interface and stowed adjacent the primary interface without the use of a recess. In either situation it is preferable to have the upper surface of the primary interface essentially coplanar with the upper surface of the secondary interface. Also, when a recess is used, it is preferable to have the recess deep enough to place the front edge of the secondary interface essentially coplanar with the front edge of the primary interface. The recess should also open into the upper surface of the primary interface such that when the secondary interface is in its stowage position its upper surface is coplanar with the primary interface.

The secondary interface member is secured to the primary interface member by way of securement means. The securement means includes a second extension-retraction means for extending and retracting the secondary interface with respect to the primary interface. The secondary interface can thus be stowed or nested away against or within the primary interface and extended out away from the primary interface.

The primary interface includes a first outboard end and a second outboard end. The first extension-retraction means includes a first extension-retraction member and a second extension-retraction member. The first extension-retraction member is secured to the primary interface closer to the first outboard end than to the second outboard end while the second extension-retraction member is secured to the primary interface at a position closer to the second outboard end than to the first outboard end. Furthermore, the first and second extension-retraction members are pivotably connected to the primary interface and each extension-retraction member is individually extendable and retractable such that the primary interface can be angularly adjusted with respect to the deck by varying the amount of extension and retraction of the first and second extension-retraction members.

In a preferred embodiment, the first and second extension-retraction members include a hydraulic cylinder, a tubular guide positioned adjacent the hydraulic cylinder and secured to the under surface of the deck, a support arm slidingly received in the tubular guide, and a bracket member. The bracket member is pivotably joined at one end to the hydraulic cylinder and pivotably joined at its other end to the support arm. In addition, the bracket is secured to the primary interface. Alternatively, the hydraulic cylinder could be maintained within the tubular guide and tubular support arm. In either situation, when the hydraulic cylinder is extended for one extension-retraction member and the hydraulic cylinder for the other extension-retraction member is retracted, the primary interface member is set at an angle with respect to the end edge of the deck. Preferably, the maximum angle amount is about 15 degrees with respect to a center line extending parallel with the end edge of the deck.

The primary interface also preferably includes a first lateral extension positioned at the first outboard end a second lateral extension positioned at the second outboard end. The first and second lateral extensions include pivotable connection means as well as means to lock the lateral extensions into a first position wherein an upper surface of the lateral extensions is generally planar with an upper surface of the remaining main body portion of the primary interface and into a second position wherein the lateral extensions are locked in place below the upper surface of the main body portion of the primary interface. For example, by rotating downwardly two 15 inch lateral extensions positioned at opposite ends of the main body portion of the primary interface and locking those lateral extensions, preferably along the underside of the primary interface, a 92 inch wide primary interface can be reduced to 62 inches. By designing the secondary interface to have a width of 60 inches, the combination of the 62 inches and 60 inches interface members enables use of the loader with respect to certain aircraft which require the primary interface to also be extended into the fuselage cutout or access opening. In fact, the door sill of the lower deck cargo doors of certain airplanes, such as that of a 747 or DC-10 aircraft, is recessed within the outer skin of the aircraft and some lower deck cargo doors are only wide enough (about 65 inches) to take 60 inch wide containers.

Further, some aircraft have a wing fillet which makes the loading or unloading operation even more problematic. With aircraft having recessed door sills and/or wing fillets, the primary and secondary interfaces must extend into the opening to reduce the gap over which the pallets and containers must pass.

If it was possible to extend the secondary interface without lowering or retracting the lateral extensions, the operator might extend the primary interface to reduce the gap and damage the skin and/or fairing of the airplane.

With the secondary interface retracted, the primary interface can be extended with the lateral extensions outwardly extending so as to align the primary interface with wider door openings.

The invention also contemplates the use of one or more power rollers which are positioned on the primary interface. Means for drivingly rotating the power roller or rollers is preferably attached to the primary interface in a position below the under surface of the primary interface. A preferred embodiment also provides means for manipulating the power rollers either to a first position wherein the power rollers are above the upper planar surface of the primary interface and adapted for contact with cargo or to a second position wherein the power rollers are recessed so as to be flush with or below the upper planar surface of the primary interface. In addition to power rollers, nonpowered or idler rollers can also be provided to assist in the conveyance of cargo loads across the extended interface. The idler rollers are preferably provided on the lateral extensions to assist in conveyance of cargo over the extremities of the primary interface. When the primary interface is set at an angle in one direction or another, the power rollers assist in turning the containers to the new direction of travel required for on/off loading.

The second extension-retraction means includes a first set of link members and a second set of link members transversely spaced from one another. The first and second sets of link members each include a first link member pivotably secured to the primary interface and a second link member pivotably secured to the first link member at one end and to the secondary interface at the other end. This arrangement enables the folding of the secondary interface into the recess formed in the primary interface or into a position adjacent the front of the primary interface. The first and second sets of link members also each include releasable locking means such as a locking pin extending through an aperture spaced from the common pivot point of the two link members. The secondary interface preferably is provided with at least one roller to assist in the conveyance of cargo across the interface and onto the deck.

The invention further contemplates providing the secondary interface with a powered roller or rollers. In addition, rather than relying on the link members, the secondary interface can be mounted to the primary interface in a manner similar to the arrangement used to secure the primary interface to the deck structure. The latter arrangement provides for even a greater degree of angular adjustment as both the primary and secondary interfaces can be angularly adjusted.

The invention also contemplates the use of spring loaded rollers and a plurality of bumpers placed serially across the front end edge of the deck. The spring loaded rollers are designed to retract into a recess formed in the edge of the deck whenever the primary interface is in abutment with the end of the deck. Once the primary interface is extended the spring loaded rollers extend into a position to assist in the conveyance of cargo between the primary interface and the deck.

In a preferred embodiment of the invention, a safety feature is provided such that whenever the secondary interface is extended from its stowed position, the primary interface is precluded from being extended until the two lateral extensions have been rotated down and locked in place. Accordingly, detection means is relied upon both to determine whether the secondary interface is in an extended position and whether the lateral extensions are in an up or down position. Preferably, the detection means is in communication with control means for controlling the electrical or fluid input to the first extension-retraction means so as to enable either the activation or deactivation of the first extension-retraction means. If the detection means determines that the secondary interface is in an extended position and a lateral extension is still in an up position, than the detection means will signal the control means to deactivate the first extension-retraction means such that the primary interface can not be extended. Alternatively, a mechanical latch in the lateral extensions can be provided to prevent extension of the secondary interface with the lateral extensions in an up position; and, conversely, to prevent the raising of the lateral extensions with the secondary interface extended.

An additional contemplated feature of the present invention is the inclusion of a pair of notched passageways in the primary interface and a pair of covers which can be releasably secured in the notched passageways. The notched passageway include tine ways for facilitating the positioning of fork lift tines during the removal and loading of containers at the front of the loader by means of a forklift or similar device.

BRIEF DESCRIPTION OF THE FIGURES

FIG. 4 shows a cut-a-way planar view of the interface system shown in FIG. 2 with both the primary interface and secondary interface in a retracted position;

FIG. 5 shows a cut-a-way planar view of the interface system shown in FIG. 2 with the primary interface and secondary interface in an extended position and, exemplified by dashed lines, the primary and secondary interface set at an angle with respect to the end edge of the deck;

FIG. 5A shows a planar, cut-away view of the interface system having a modified securement means securing the secondary interface to the primary interface;

DETAILED DESCRIPTION OF THE PREFERRED EMBODIMENTS

Figure 1:
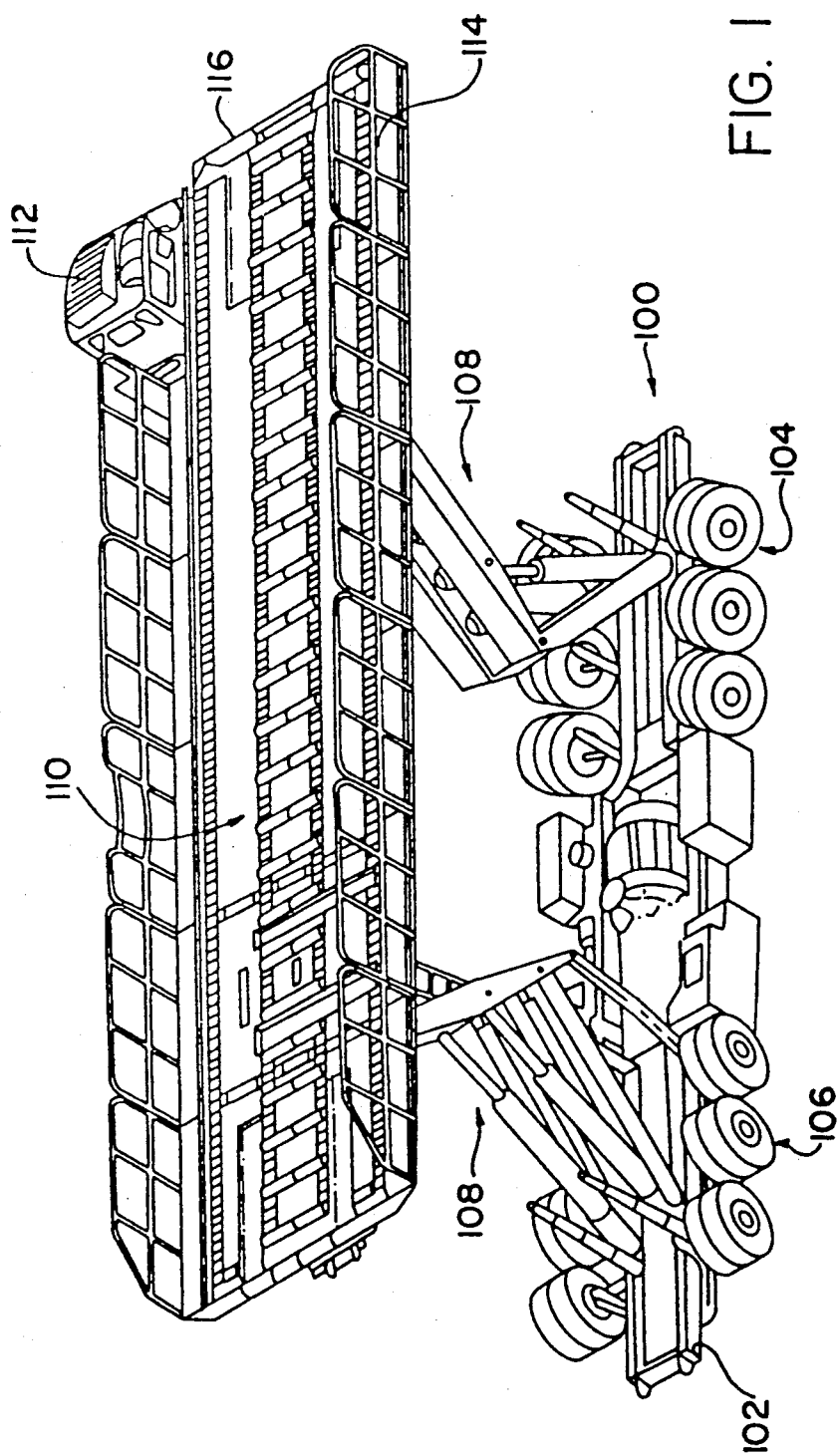
FIG. 1 shows a perspective view of a transport loader having a preferred embodiment of the interface system attached therewith.

FIG. 1 shows a perspective view of an aircraft loader 100 having a base frame 102 supported by a set of steerable wheels 104 and a set of driving wheels 106. Main lift assembly 108 is secured to the under structure of deck 110. Deck 110 has operator's cab 112 secured on the left-hand side edge of deck front end 114.

Positioned at the forward edge of deck front end 114 is interface system 116.

Figure 2:
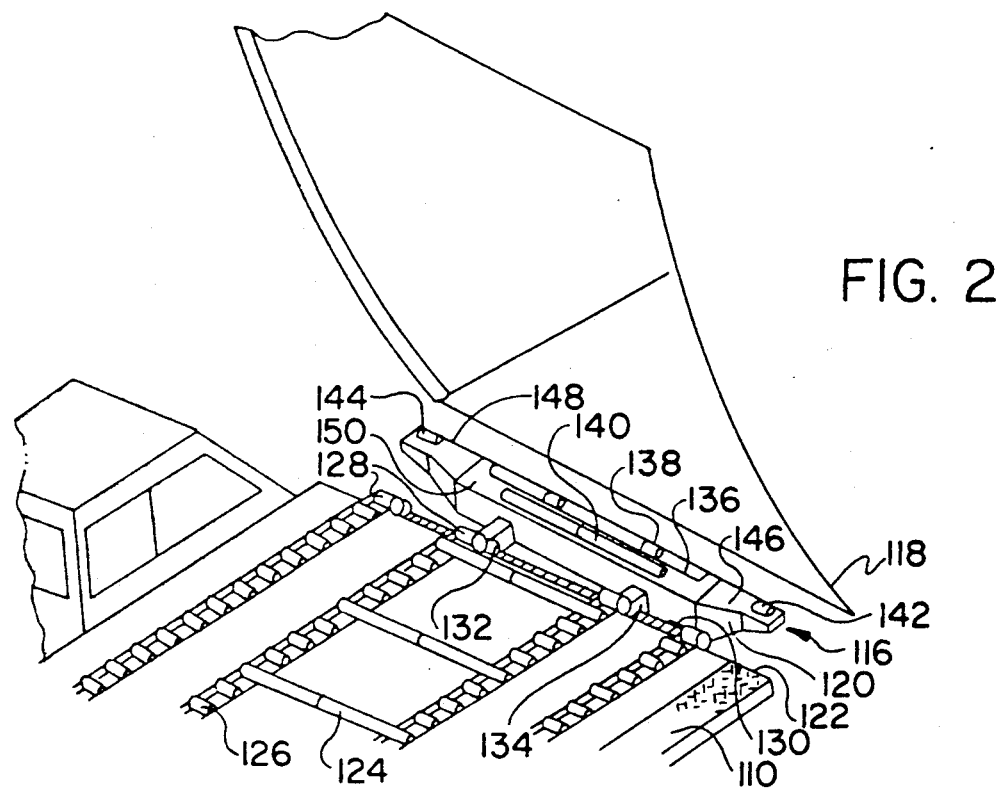
FIG. 2 shows a cut-a-way view of the front end of the transport loader's deck as well as a cut-a-way view of an aircraft cargo door.

FIG 2 illustrates interface system 116 positioned between a cargo door frame 118 and deck 110. As there shown, primary interface 120 is positioned between aircraft door 118 and deck 110 from which it is supported. Deck 110 is shown to have a front edge 122 and both power rollers 124 and idler rollers 126 positioned along the deck's upper conveying surface. Deck 110 further includes spring loaded rollers 128 and bumpers 130.

Primary interface 120 includes support arms 132 and 134 which are secured in a sliding relationship to the under surface of deck 110. As shown in FIG. 2, by extending support arm 132 further out away from the front edge 122 of deck 110 than extension support arm 134, an angled orientation of primary interface 120 relative to the deck is possible. FIG. 2 further illustrates secondary interface 136 in its stowed position wherein secondary interface 136 is received within a corresponding recess or cutout formed in the front of primary interface 120. Secondary interface 136 can include idler rollers 138 while primary interface 120 features powered rollers 140 as well as its own idler rollers 142 and 144. Idler rollers 142, 144 are preferably positioned on the outboard ends of primary interface 120 and, more preferably, on the upper surface of lateral extensions 146 and 148 which extend outwardly off of main body portion 150.

Figure 3:
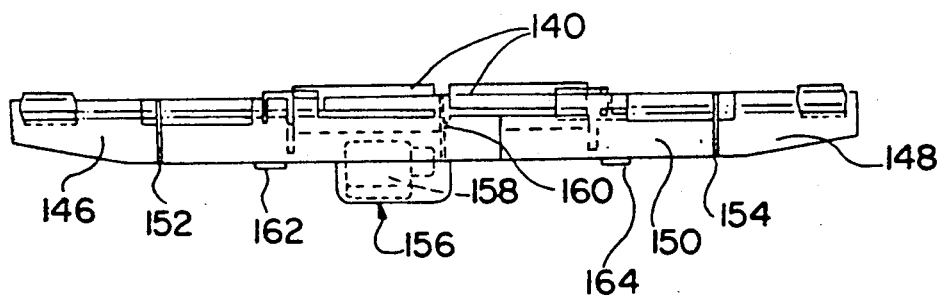
FIG. 3 shows a front end view of the interface system shown in FIG. 2.

FIG. 3 shows a front end view of interface system 116. As there shown, lateral extensions 146 and 148 are pivotably connected to main body portion 150 at hinge locations 152, 154, respectively. Positioned under power pollers 140 is power means 156 which includes an appropriate driving source such as an electric motor or hydraulic motor 158 together with an appropriate gearing or pulley system 160. FIG. 3 also reveals sensors 162 and 164 the purpose for which is discussed further below.

FIG. 4 illustrates a planar view of interface system 116 as well as a cut-a-away portion of deck 110. As shown in FIG. 4, a plurality of spring rollers 128 extend out from front edge 122 of deck 110 towards the inside surface of primary interface 120. Spring loaded rollers 128 are adapted for compression situations such as where primary interface 120 is retracted against bumpers 130. Support arms 132 and 134 are shown slidingly received within guide extension channel members 166 and 168 which can be supported by the under surface of deck 110. Hydraulic cylinders 170 and 172 are shown positioned adjacent guide extension channel members 166, 168. Hydraulic cylinders 170 and 172 can also be secured to the under structure of deck 110. FIG. 4 further illustrates secondary interface 136 as well as the extension-retraction means for the secondary interface which comprises link assemblies 174 and 176. As shown in FIG. 4, each link assembly includes a pair of link members adapted to be placed in a folded arrangement when secondary interface 136 is nestled within cutout 178 formed in primary interface 120.

FIG. 5 illustrates in planar view both secondary interface 136 and primary interface 120 in an extended position with respect to deck 110. FIG. 5 further illustrates, in dashed lines, the maximum angle adjustment made possible by extending one extension member to a greater extent than the other. FIG. 5 shows support arms 132 and 134 extending out away from front edge 122 of deck 110. The extension of support arms 132 and 134 is made possible by extending rods 180 and 182 which from a part of hydraulic cylinders 170 and 172 (FIG. 4). The ends of rods 180 and 182 are pivotably connected to brackets 184 and 186. Brackets 184 and 186 also include means for pivotably securing the forwardmost ends of support arms 132 and 134. In addition, bracket members 184 and 186 are secured to main body 150 of primary interface 120. The pivotal relationship between brackets 184, 186 and corresponding cylinder rods 180 and 182 as well as the pivotal relationship between brackets 184, 186 and extension support arms 132 and 134 makes it possible for angle adjustments to be made to the primary interface 120 as illustrated in the dashed lines in FIG. 5. The maximum angle of adjustment is represented by angle X which is a preferred embodiment is about 15 degrees. Although primary interface 120 is shown angled towards the right front end of deck 110, a similar angle adjustment can be made in an opposite, counterclockwise, direction. The notched recesses provided at the ends of lateral extensions 146 and 148 avoids premature abutment when primary interface is being angularly adjusted. The extension-retraction means between primary interface 120 and deck 110 and the extension-retraction means between primary interface 120 and secondary interface 136 each preferably has a maximum extension of about one foot.

FIG. 5 illustrates link assemblies 174 and 176 which each include a first link member 188 and a second link member 190 at the other end. Link members 188 are pivotably connected to primary interface 120 at one end and to a corresponding link member 190 by way of pin member 179' at their other end. Link members 190 are secured at their other end to secondary interface 136*. Link members 188 and 190 can be locked in an extended position by appropriate locking means such as a locking pin 188' extending through an aperture being in both link members 188 and 190 with the aperture formed a short distance away from the pivot connections between link members 188 and 190. FIG. 5 also illustrates sensor 192 the purpose for which is described further below.

FIG. 5A illustrates an alternate embodiment of the invention wherein secondary interface 136' is positioned adjacent primary interface 120'. The elements in common with those shown in FIG. 4 have been designated with equivalent primed numbers. FIG. 5A further reveals the replacement of link assemblies 174 and 176 with a hydraulic system featuring a right hydraulic assembly 300 and a similar left hydraulic assembly (not shown). Hydraulic assembly 300 includes tubular guide 301 and slide member 302 slidingly received within tubular guide 301. Slide member 302 is pivotably attached at 307 to pivot support 303 which is attached to secondary interface 136. Pivot support 303 is also pivotably attached to rod 305 of hydraulic member 306. Hydraulic member 306 is preferably secured to the under surface of primary interface 120'.

Figure 9:
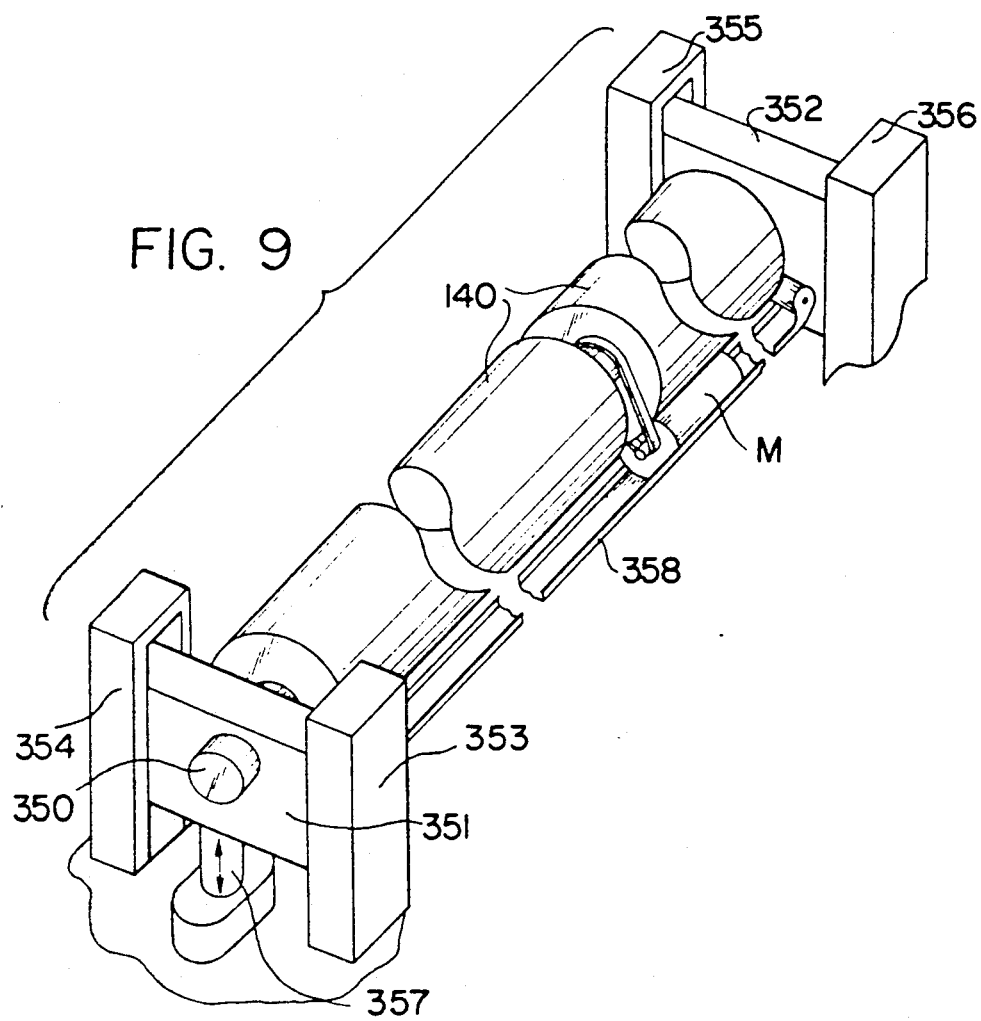
FIG. 9 shows, in cut-away, a perspective view of the powered rollers of the present invention.

FIG. 5A also illustrates rollers 308 in secondary interface 136' which are preferably powered either by a source attached to the under surface of secondary interface 136' (not shown) or through the same driving means used for powered rollers 140 which is shown in FIG. 9 and discussed further below.

Figure 6:
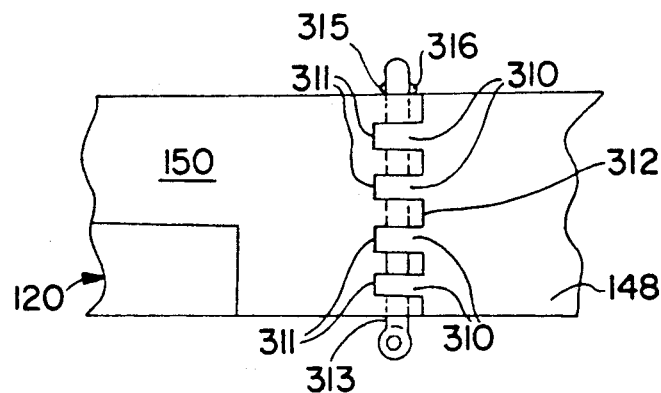
FIG. 6 shows a planar cut-a-way view of an outboard end of the primary interface with the lateral extension locked in an extended position.
Figure 6A:
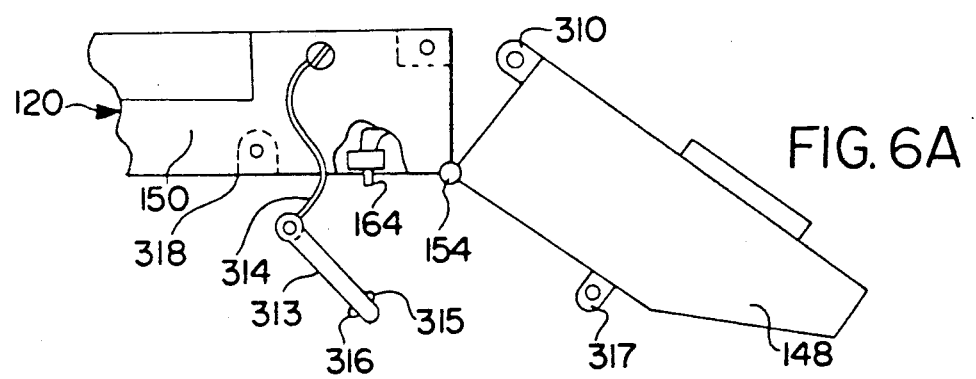
FIG. 6A shows an elevational, cut-away view of an outboard end of the primary interface having an unlocked and partially rotated lateral extension.
Figure 6B:
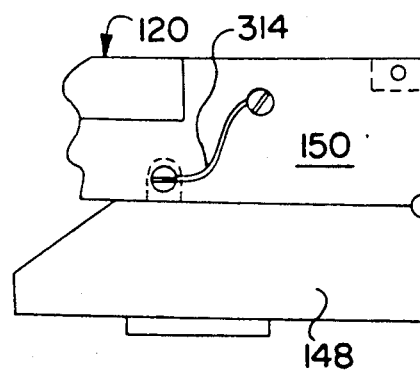
FIG. 6B shows the arrangement of FIG. 6A except for the lateral extension being fully rotated and locked into a second position below the main body portion of the primary interface.

FIG. 6, 6A and 6B illustrate lateral extension 148 in pivotal connection with main body portion 150 of primary interface 120. The pivotal relationship between lateral extension 148 and main body portion 150 is made possible by hinge connection 154. As it is required to reduce the transverse width of primary interface 120 for certain aircraft cargo door frame sizes, lateral extension 148 is made positionable in one of two locations. The first location is when the lateral extensions extend outwardly as shown in FIG. 3-5 and FIG. 6. The second location is when the lateral extensions are locked in the manner illustrated in FIG. 6B.

As further shown in FIGS. 6, 6A and 6B, lateral extension 136 is formed with a plurality of upper insert members 310. Main body portions 150 has formed therein a plurality of upper recesses 311 for receiving insert members 310. Recesses 311 are defined by upper extensions 312 formed at the end of main body portion 150. Both upper extensions 312 and upper insert members 310 have an aperture formed therein for receipt of pin 313 when insert members 310 are received within recesses 311. FIG. 6 illustrates the arrangement wherein pin 313 locks insert members 310 in position within recesses 311.

Locking pin 313 is connected to main body portion 150 by lanyard 314. Positioned at the end of locking pin 313 in a pair of spring biased locking balls 315, 316 which prevent locking pin 313 from inadvertently sliding out from a locking position.

FIG. 6A illustrates the unlocking of insert members 310 from recesses 311 and rotation of lateral extension 148 to an intermediate position between the first locking position as shown in FIG. 6 and the second locking position as shown in FIG. 6B.

FIGS. 6A and 6B illustrate lower insert members 317 (one shown) which are received in lower recesses 318 in a manner similar to that described for the first locking position. As shown in FIG. 6B, once lower inserts 317 are inserted within recesses 318 and the apertures in each are aligned, pin 313 can be inserted to fix lateral extension 136 in the second locking position.

FIG. 6A also shows sensor 164 which detects whether lateral extension 148 is in the first or second locking position. As previously noted, in a preferred embodiment, if secondary interface 136 is in its extended position, primary interface 120 can only be extended out away from deck 110 when lateral extensions 146 and 148 are in the second locking position below main body portion 150. Sensor 164 thus provides an indication that lateral extension 148 is in its proper position such that hydraulic cylinder 172 can be extended. A similar arrangement is provided on the opposite side. Sensor 192 shown in FIG. 5 provides a means to determine whether secondary interface 136 is extended or remains in a stowage position. Various other means for releasably locking lateral extension 146 and 148 in the first and second locking positions are also contemplated although the above described arrangement is preferred.

Figure 7A:
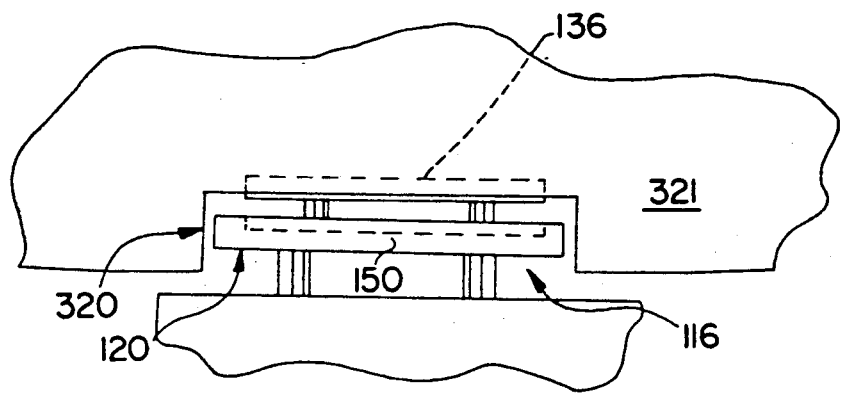
FIG. 7A shows a planar cut-away view of the interface system being used with an airplane having a recessed door sill.
Figure 7B:
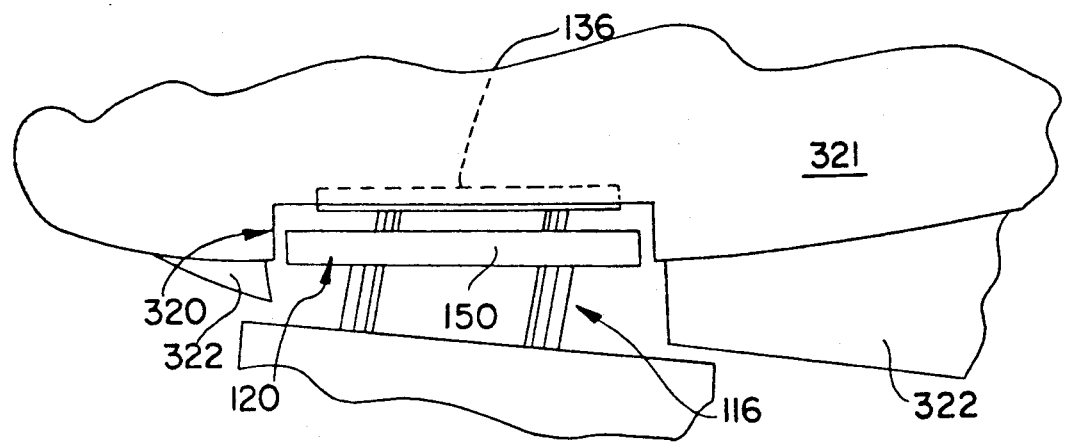
FIG. 7B shows a planar cut-away view of the interface system having angularly adjustable primary and secondary interfaces in operation with respect to an airplane having a recessed door sill and a wing fillet.

FIGS. 7A and 7B illustrate an extended primary interface 120 with lateral extensions 146 and 148 in the second locking position and an extended secondary interface 136. More particularly, FIG. 7A illustrates the relationship between interface system 116 and the lower deck cargo door 320 of aircraft 321, such as a 747 or a DC-10 aircraft, recessed within the outer skin of the aircraft. FIG. 7B illustrates an aircraft having a wing fillet 322 with a recessed area for access to cargo door 320. Detectors 162 and 164 would prevent extension of secondary interface 136 until after lateral extensions 146 and 148 are placed in the second locking position. If it was possible to extend secondary interface 136 without lowering lateral extensions 146 and 148, then the operator could inadvertently extend primary interface 120 to reduce the gap and damage the skin and/or fillet of the aircraft. With the secondary interface retracted, however, it is possible to extend the primary interface with lateral extensions 146, 148 in the first locking position such that primary interface 120 can be aligned with wider door openings of the aircraft such as the 104 inch cargo door in FIG. 2. FIG. 7B also illustrates the use of extension-retention members such as those shown in FIG. 5A to secure the secondary interface to the primary interface such that the secondary interface can be varied in angular position with respect to the primary interface. In a preferred embodiment both the primary and secondary interface can be angularly adjusted. The present invention also contemplates making only one of the two interfaces angularly adjustable.

Figure 8A:
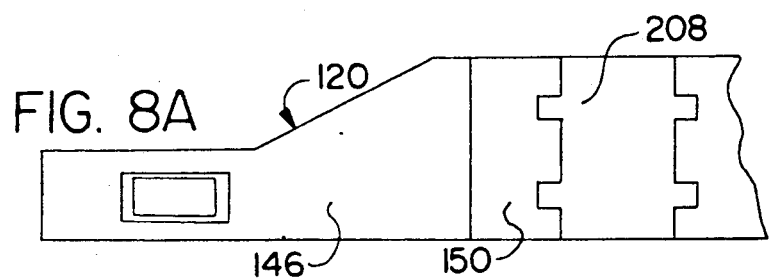
FIG. 8A shows a planar, cut-away view of the outboard end of the primary interface which has a notched passageway formed therein.

FIG. 8A illustrates notched passageway 208 formed in main body portion 150 of primary interface 120. A notched passageway, similar to notched passageway 208, is provided on the opposite side of power rollers 140 and is spaced to match the transverse spacing of forklift truck tines. These notched passageways enable the operator of a forklift truck to easily slide the forklift tines between a heavy cargo container and the upper surface of the primary interface so as to facilitate the dropping off or picking up of a container.

Figure 8B:
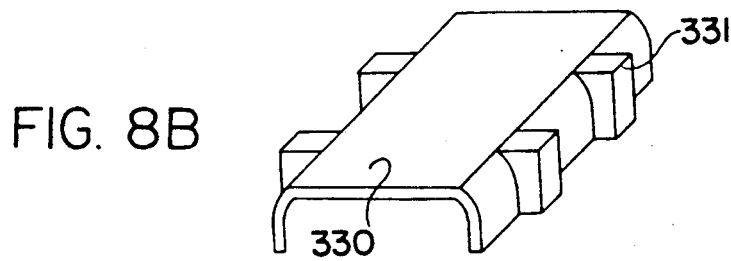
FIG. 8B shows a perspective view of a cover insertable within the notched passageway.
Figure 8C:
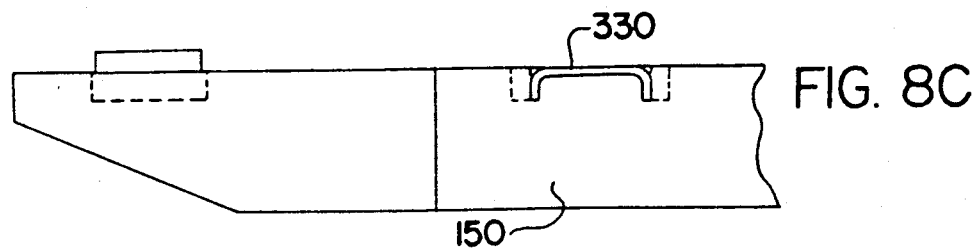
FIG. 8C shows an elevational view of the cover in position within the notched passageway.

FIG. 8B illustrates cover 330 with protrusions 331 positioned for releasably retaining cover 330 in position within notched passageway 148 as shown in FIG. 8C. With cover 330 in position an essentially complete upper planar surface is provided so as to facilitate manual sliding of containers along the upper surface of primary interface 120. Covers 330 are removed and stored when the notched passageways are in use.

FIG. 9 illustrates power rollers 140 removed from their recessed position within main body portion 150 for the sake of clarity. As shown, power rollers 140 include a shaft 350 which is received at its ends within bearing support members 351 and 352. Bearing support member 351 is slidingly retained within grooved blocks 353 and 354. Likewise, bearing support member 352 is slidingly retained within grooved blocks 355 and 356. Hydraulic means 357 (one shown) are positioned below bearing support members 351 and 352 for enabling variations in the height of the upper surface of the rollers with respect to main body portion 150.

Driving means M, which could include an electric or hydraulic motor coupled with engagement means is drivingly engaged with shaft 152. To retain driving means M in position while rollers 140 are varied in height, bracket support 358 is secured at its ends to bearing support members 351 and 352. Preferably, power rollers 140 are adjustable to a first position wherein an upper surface of power rollers 140 is above the upper surface of main body portion 150 and into a second position where the upper surface of power rollers 140 is either flush or below the upper surface of main body portion 150. A similar arrangement as that described above could be utilized for driving rollers 308 in FIG. 5A.

Figure 10:
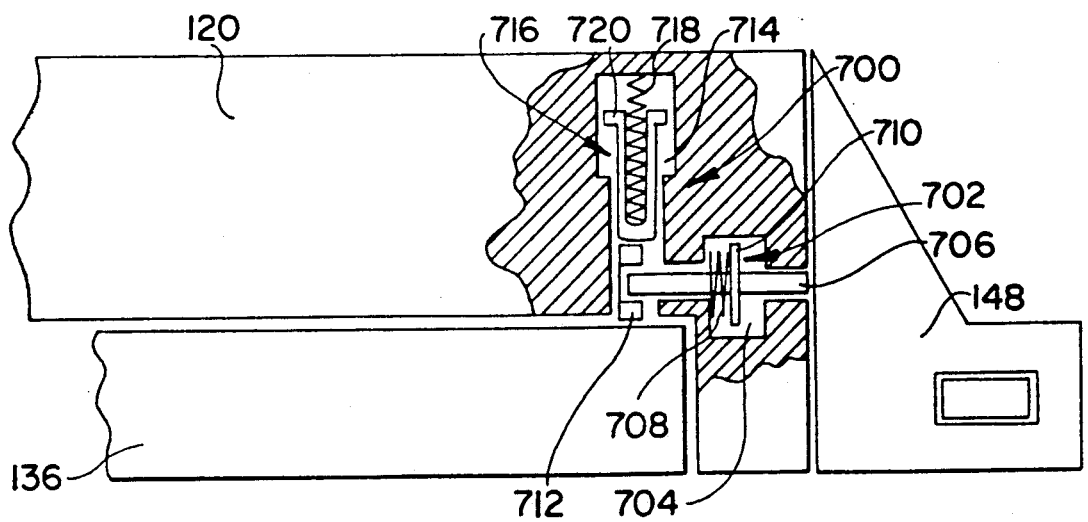
FIG. 10 shows a partially cut-away, planar view of a mechanical latch assembly suitable for preventing extension or retraction of the secondary interface.

FIG. 10 shows a partially cut-away, planar view of the mechanical latch assembly 700 supported within primary interface 120. Mechanical latch assembly 700 includes first preventing means 702 which comprises cavity 704 and pin member 706 biased outward by spring 708. Spring 708 is attached to flange 710 at one end and to a wall of cavity 704 at the other end. When a lateral extension (e.g., 148) is in an up position, pin member 706 is forced inwardly into reception means 712 which is secured to secondary interface 136. When lateral extension is placed in a down position, spring 708 forces pin 706 outwardly and out of engagement with reception means 712 leaving secondary interface free for extension.

Reception means 712 is received within recess 714 forming part of second preventing means 716 which also includes spring member 718 and plate member 720. When lateral extension 148 is down and secondary interface 136 is extended, plate 720 is biased forward to fill a portion of the recess and prevent pin member 706 from engaging with reception means 712.

Although the present invention has been described with reference to preferred embodiments, the invention is not limited to the details thereof. Various substitutions and modifications will occur to those of ordinary skill in the art, and all such substitutions and modifications are intended to fall within the spirit and scope of the invention as defined in the appended claims.

What is claimed is:

1. An interface system for a cargo loader comprising:
   a primary interface;
   connecting means for connecting said primary interface to said deck, said connecting means including first extension-retraction means for extending and retracting said primary interface with respect to said deck;
   a secondary interface member adapted for stowage adjacent to said primary interface;
   securement means for securing said secondary interface to said primary interface, said securement means including second extension-retraction means for extending and retracting said secondary interface with respect to said primary interface such that said secondary interface can be stowed adjacent to said primary interface and extended and spaced out away from said primary interface; and
   said primary interface including a first outboard end and a second outboard end, said first extension-retraction means including a first extension-retraction member and a second extension-retraction member, and said first and second extension-retraction members connected to the outboard ends of said primary interface such that the first and second outboard ends of said primary interface are movable out away from and towards said deck upon activation of said extension-retraction members.

2. An interface system as recited in claim 1 wherein said primary interface has an elongated recess formed therein adapted to at least partially receive said secondary interface therein when said secondary interface is in a stowage position.

3. An interface system as recited in claim 2 wherein said primary interface has an upper surface and said secondary interface has an upper surface and the recess in said primary interface extends to the upper surface of said primary interface, and said recess being dimensioned and arranged so as to receive said secondary interface in a manner which places the upper surface of said secondary interface essentially coplanar with the upper surface of said primary interface.

4. An interface system as recited in claim 3 wherein said primary interface and said secondary interface have a planar forward surface and the recess in said primary interface is dimensioned and arranged such that the forward surface of said secondary interface is positioned in an essentially coplanar relationship with the forward surface of said primary interface when said secondary interface is in said stowage position.

5. An interface system as recited in claim 1, wherein said primary interface is sandwiched between said deck and said secondary interface, and said primary interface having an upper surface and said secondary interface having an upper surface with said upper surfaces being essentially coplanar.

6. An interface system as recited in claim 1, wherein said primary interface means includes a first lateral extension on said first outboard end, a second lateral extension on said second outboard end and a main body portion therebetween, and said interface system further comprising locking means for locking said lateral extensions in a first position wherein an upper surface of said lateral extensions is essentially coplanar with an upper surface of said main body portion and into a second position wherein said lateral extensions are locked in place below the upper surface of said main body portion.

7. An interface system as recited in claim 6 wherein said primary interface further includes pivotable connection means for pivotably connecting said lateral extensions to said main body portion of said primary interface.

8. An interface system as recited in claim 7 wherein said releasable locking means includes a first locking assembly comprising an insertion member formed on each of said lateral extensions and a complimentary recess formed at a first and second end of said main body portion, each insertion member having an aperture formed therein which aligns with an aperture formed in a respective one of said first and second ends of said main body portion and which opens into an adjacent complimentary recess, said first locking assembly further comprising pin members sized for insertion through aligned apertures at said ends of said main body portion so as to releasably lock said lateral extensions to said main body portion.

9. An interface system as recited in claim 8, wherein said releasable locking means include a second locking assembly comprising insertion members extending out off a lower surface of said lateral extensions and recesses formed in a lower surface of said main body portion and adapted to receive therein said insertion members, said insertion members further including apertures formed therein which align with apertures formed in said main body portion when said insertion members extending off the lower surface of said lateral extensions are received within the recesses formed within the lower surface of said main body portion.

10. An interface system as recited in claim 6, further comprising means for detecting whether said secondary interface has been extended, means for determining whether said lateral extensions are in a first or second position and means for preventing the extension of said primary interface if said lateral extensions are determined to be in said first position.

11. An interface system as recited in claim 1, wherein said first extension-retraction member is pivotably connected to said primary interface and said second extension-retraction member is pivotably connected to said primary interface.

12. An interface system as recited in claim 11, wherein said first extension-retraction member includes a support arm and said second extension-retraction member includes a support arm and said first and second extension-retraction members include means for individually extending and retracting said support arms such that said primary interface can be angularly adjusted with respect to said deck by varying an amount of extension and retraction of said first and second extension-retraction members.

13. An interface system as recited in claim 12 wherein said second extension-retraction means includes a third extension-retraction member and a fourth extension-retraction member, said third and fourth extension-retraction members being spaced from one another and supported by said primary interface, and said third and fourth extension-retraction members including attachment means for attaching said third and fourth extension-retraction members to said secondary interface.

14. An interface system as recited in claim 13 wherein said third and fourth extension-retraction members are pivotably secured to said secondary interface and dimensioned and arranged so as to be individually extendable and retractable such that said secondary interface can be angularly adjusted with respect to said primary interface.

15. An interface system as recited in claim 14 wherein said third and fourth extension-retraction members each comprise a tubular guide member supported by said primary interface, a slide member telescopically received within said tubular-guide member, said slide member being pivotably attached to said attachment means, and a hydraulic cylinder adapted to extend said slide member.

16. An interface system as recited in claim 13 wherein each of said third and fourth extension-retraction members comprise a pair of link members pivotably secured to each other and with one link member of each of said pairs of link members being pivotably secured to said primary interface and the other link member of each of said pairs of link members being pivotably secured to said secondary interface.

17. An interface system as recited in claim 12, wherein said primary interface further comprises idler rollers.

18. An interface system as recited in claim 11, wherein said first and second extension-retraction members each comprise hydraulic means, a guide channel supported by said deck; a support arm slidingly received within said guide channel, and said hydraulic means including means for shifting position of said support arm with respect to said guide channel.

19. An interface system as recited in claim 1, wherein said first extension-retraction means includes means for angular adjustment of said primary interface in both a counterclockwise and a clockwise direction.

20. An interface system as recited in claim 19 wherein a maximum angle of adjustment is about 15°.

21. An interface system as recited in claim 1, wherein said primary interface means includes a power roller and means for drivingly rotating said power roller.

22. An interface system as recited in claim 21, wherein said primary interface includes means for lowering and extending said power roller from a first position wherein said power roller has an upper portion above an upper surface of said primary interface to a second position wherein said upper portion is flush or below said upper surface.

23. An interface system as recited in claim 21, wherein said means for drivingly rotating said roller includes a motor supported by said primary interface.

24. An interface system as recited in claim 23, wherein said primary, interface further comprises idler rollers.

25. An interface system as recited in claim 1, wherein said second extension-retraction means includes a first set of link members and a second set of link members transversely spaced from said first set of link members, with said first and second sets of link members each including a first link member pivotably secured to said primary interface and a second link member pivotably secured to said first link member at one end and to said secondary interface at the other end such that said secondary interface is foldable into position adjacent said primary interface, link 26. An interface system as recited in claim 25, wherein said first and second sets of link members each include releasable locking means for locking said sets of link members in an extended position and said releasable locking means includes a lock pin.

27. An interface system as recited in claim 25 wherein said secondary interface includes at least one roller.

28. An interface system as recited in claim 27 further comprising a motor for rotating said roller.

29. An interface system as recited in claim 1 wherein said second extension-retraction means includes a pair of extension-retraction members supported by said primary interface and each extension-retraction member being pivotably secured to said secondary interface and dimensioned and arranged so as to be individually extendable and retractable such that said secondary interface can be angularly adjusted with respect to said primary interface.

30. An interface system as recited in claim 1 wherein said deck includes spring loaded rollers which are compressed into a storage mode when said primary interface is in abutment with said deck and in an extended position when said primary interface is in an extended position.

31. An interface system as recited in claim 1, wherein said primary interface comprises a pair of passageways for receiving fork lift tines and a pair of covers received in said passageways for covering said notched passageway, and said covers being, releasably retained within said passageways.

32. An interface system as recited in claim 1 wherein said primary interface has a first lateral extension at said first outboard end and a second lateral extension at said second outboard end, said lateral extensions including means for pivotably connecting said lateral extensions at said outboard ends such that said lateral extensions are free to assume an up position and a down position; and
said interface further comprising first preventing means for preventing said second extension-retraction means from extending said secondary interface when one or both of said lateral extensions are in the up position and second preventing means for preventing said lateral extensions from assuming the up position when said lateral extensions are in the down position and the secondary interface is in an extended state.

33. An interface system as recited in claim 32 wherein said first preventing means includes a pin member supported by said primary interface and means for biasing said pin member laterally outward, said pin members being positioned so as to have one end contact a respective one of said lateral extensions such that said biasing means is in a compressed state when said lateral extension is in an up position, said secondary interface including reception means for receiving the other end of said pin member when said lateral extension is in an up position such that said secondary interface is locked to said primary interface, and said biasing means adapted to force said pin member laterally outward and out of engagement with said reception means when said lateral extension is in a down position.

34. An interface system as recited in claim 33 further comprising a plate member and a spring member biasing said plate member, said plate member and said spring member being supported by said primary interface and said plate member being received within a cavity in said primary interface into which said reception means extends when said secondary interface is in a stowage position, said spring member biasing said plate member into said recess when said secondary interface is extended such that said pin member is prevented from becoming engaged with said reception means.

35. An aircraft transport loader, comprising:
an upper deck structure having conveying means thereon;
means for supporting and transporting said upper deck structure;
a primary interface member;
connecting means for connecting said primary interface to said deck, said connecting means including first extension-retraction means for extending and retracting said primary interface with respect to said deck, said connecting means further comprising angle adjustment means for angularly adjusting said primary interface about a central axis so as to have a first end of said primary interface closer to said deck than a second end or to have the second end closer to said deck than said first end;
a secondary interface member adapted for positioning in a stowage position adjacent said primary interface;
securement means for securing said secondary interface to said primary interface, said securement means including second extension-retraction means for extending and retracting said secondary interface with respect to said primary interface such that said secondary interface can be placed in said stowage position and extended out away from said primary interface.

36. An aircraft transport loader as recited in claim 35 wherein said primary interface includes means for adjusting a transverse length of said primary interface.

37. An aircraft transport loader as recited in claim 35 wherein said primary interface has a recess formed therein within which said secondary interface is at least partially received when said secondary interface is in said stowage position.

38. An interface system for a cargo loader comprising:
a deck;
a primary interface;
connecting means for connecting said primary interface to said deck, said connecting means including first extension-retraction means for extending and retracting said primary interface with respect to said deck;
a secondary interface member adapted for stowage adjacent to said primary interface;
securement means for securing said secondary interface to said primary interface, said securement means including second extension-retraction means for extending and retracting said secondary interface with respect to said primary interface such that said secondary interface can be stowed adjacent to said primary interface and extended out away from said primary interface; and
said primary interface including a first outboard end and a second outboard end, said primary interface further including a first lateral extension on said first outboard end, a second lateral extension on said second outboard end and a main body portion therebetween, and said interface system further comprising locking means for locking said lateral extensions in a first position wherein an upper surface of said lateral extensions is essentially coplanar with an upper surface of said main body and into a second position wherein said lateral extensions are locked in place below the upper surface of said main body.

39. An interface system as recited in claim 38. wherein said first extension-retraction means includes a first and a second extension-retraction member, and said first and second extension-retraction members being connected to the outboard ends of said primary interface such that the first and second outboard ends of said primary interface are movable away from and towards the deck upon activation of said extension-retraction members.

40. An interface system for a cargo loader comprising:
   a deck;
   a primary interface;
   connecting means for connecting said primary interface to said deck, said connecting means including first extension-retraction means for extending and retracting said primary interface with respect to said deck;
   a secondary interface member adapted for stowage adjacent to said primary interface;
   securement means for securing said secondary interface to said primary interface, said securement means including second extension-retraction means for extending and retracting said secondary interface with respect to said primary interface such that said secondary interface can be stowed adjacent to said primary interface and extended out away and spaced from said primary interface.
   said primary interface including a first outboard end and a second outboard end, and said first extension retraction means including a first extension retraction member and a second extension-retraction member with said first extension-retraction member being secured to said primary interface closer to said first outboard end than to said second outboard end, and said second extension-retraction member being secured to said primary interface closer to said second outboard end than to said first outboard end. and said first extension-retraction member being pivotably connected to said primary interface and said second extension-retraction member being pivotably connected to said primary interface.

41. An interface system for a cargo loader comprising:
   a deck;
   a primary interface;
   connecting means for connecting said primary interface to said deck, said connecting means including first extension-retraction means for extending and retracting said primary interface with respect to said deck;
   a secondary interface member adapted for stowage adjacent to said primary interface;
   securement means for securing said secondary interface to said primary interface, said securement means including second extension-retraction means for extending and retracting said secondary interface with respect to said primary interface such that said secondary interface can be stowed adjacent to said primary interface and extended out away and spaced from said primary interface, and said second extension-retraction means including a first set of link members and a second set of link member transversely spaced from said first set of link members, with said first and second sets of link members each including a first link member pivotably secured to said primary interface and a second link member pivotably secured to said first link member at one end and to said secondary interface at the other end such that said secondary interface is foldable into position adjacent said primary interface, and said first and second sets of link members each including releasable locking means for locking said sets of link members in an extended position.

* * * * *